(12) United States Patent
Hong et al.

(10) Patent No.: US 9,709,857 B2
(45) Date of Patent: Jul. 18, 2017

(54) DISPLAY DEVICE AND MANUFACTURING METHOD THEREOF

(71) Applicant: Samsung Display Co., Ltd., Yongin, Gyeonggi-Do (KR)

(72) Inventors: Seok-Joon Hong, Seongnam-si (KR); Seong Gyu Kwon, Suwon-si (KR); Ji Seong Yang, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 73 days.

(21) Appl. No.: 14/481,635

(22) Filed: Sep. 9, 2014

(65) Prior Publication Data

US 2015/0309374 A1 Oct. 29, 2015

(30) Foreign Application Priority Data

Apr. 23, 2014 (KR) ......................... 10-2014-0048917

(51) Int. Cl.
*G02F 1/1343* (2006.01)
*G02F 1/1333* (2006.01)
*G02F 1/1368* (2006.01)

(52) U.S. Cl.
CPC .. *G02F 1/134309* (2013.01); *G02F 1/133377* (2013.01); *G02F 1/1368* (2013.01); *G02F 2001/134345* (2013.01)

(58) Field of Classification Search
CPC ............. G02F 1/134309; G02F 1/1368; G02F 1/133345; G02F 2001/134345; G02F 1/133377; H01L 27/1262
USPC ........................................................ 349/141
See application file for complete search history.

(56) References Cited

U.S. PATENT DOCUMENTS

| 2007/0040976 A1* | 2/2007 | Lee | G02F 1/133707 349/134 |
| 2011/0156993 A1* | 6/2011 | Ting | G02F 1/133707 345/87 |
| 2011/0310335 A1* | 12/2011 | Hashimoto | G02F 1/133707 349/96 |
| 2012/0062448 A1* | 3/2012 | Kim | G02F 1/133377 345/55 |

(Continued)

FOREIGN PATENT DOCUMENTS

| KR | 10-2011-0070475 | 6/2011 |
| KR | 10-2014-0062286 | 5/2014 |

*Primary Examiner* — Charles Chang
(74) *Attorney, Agent, or Firm* — Innovation Counsel LLP

(57) ABSTRACT

A display device may include a substrate having a first substrate portion, a second substrate portion, and a third substrate portion positioned between the first substrate portion and the second substrate portion. The display device may further include a first roof layer and a second roof layer formed of the same material, spaced from each other, and respectively overlapping the first substrate portion and the second substrate portion. The display device may further include a transistor overlapping the third substrate portion. The display device may further include a liquid crystal set. The display device may further include a common electrode portion positioned between the first substrate portion and the liquid crystal set. The display device may further include a sub-pixel electrode positioned between the liquid crystal set and the first roof layer and electrically connected to the transistor.

10 Claims, 10 Drawing Sheets

(56) References Cited

U.S. PATENT DOCUMENTS

| | | | | |
|---|---|---|---|---|
| 2012/0062451 A1* | 3/2012 | Morishita | ......... | G02F 1/134363 345/87 |
| 2013/0265533 A1* | 10/2013 | Lim | ................. | G02F 1/133707 349/130 |
| 2014/0198284 A1* | 7/2014 | Weng | ................. | G02F 1/13394 349/106 |
| 2015/0212377 A1* | 7/2015 | Imaoku | ............. | G02F 1/134363 349/42 |

* cited by examiner

DISPLAY DEVICE AND MANUFACTURING METHOD THEREOF

CROSS-REFERENCE TO RELATED APPLICATION

This application claims priority to and the benefit of Korean Patent Application No. 10-2014-0048917 filed in the Korean Intellectual Property Office on Apr. 23, 2014, the entire contents of which are incorporated herein by reference.

BACKGROUND (a) Field

The present invention relates to a display device and a manufacturing method thereof.

(b) Description of the Related Art

A liquid crystal display may include field generating electrodes (such as a pixel electrode and a common electrode) and a liquid crystal layer interposed between the field generating electrodes. A voltage may be applied to the field generating electrodes to generate an electric field in the liquid crystal layer, for determining orientations of liquid crystal molecules of the liquid crystal layer, such that images displayed by the liquid crystal display may be controlled.

A conventional liquid crystal display may include two substrates for accommodating the field generating electrodes and other constituent elements. The two substrates may undesirably contribute weight, thickness, cost, and manufacturing time of the conventional liquid crystal display.

The above information disclosed in this Background section is for enhancement of understanding of the background of the invention. The Background section may contain information that does not form the prior art that is already known in this country to a person of ordinary skill in the art.

SUMMARY

Embodiments of the present invention may be related to a display device that includes only one substrate, such that the weight, thickness, cost, and/or manufacturing time associated with the display device may be advantageously minimized Embodiments of the present invention may be related to a method for manufacturing the display device.

According to embodiments of the present invention, in a display device, field generating electrodes may extend substantially parallel to the substrate without including portions that are substantially inclined with respect to the substrate, such that the electric field generated by the field generating electrodes may be substantially vertical to the substrate even near edges of pixel areas. Advantageously, light leakage and/or image defects may be minimized or prevented, and satisfactory image display quality may be provided.

An embodiment of the present invention may be related to a display device that may include a substrate. The substrate may include a first substrate portion, a second substrate portion, and a third substrate portion positioned between the first substrate portion and the second substrate portion. The display device may further include a first roof layer formed of a first material and overlapping the first substrate portion. The display device may further include a second roof layer formed of the first material, spaced from the first roof layer, and overlapping the second substrate portion. The display device may further include a first transistor overlapping the third substrate portion. The display device may further include a first liquid crystal set positioned between the first substrate portion and the first roof layer. The display device may further include a first common electrode portion positioned between the first substrate portion and the first liquid crystal set. The display device may further include a first sub-pixel electrode positioned between the first liquid crystal set and the first roof layer and electrically connected to the first transistor.

The first sub-pixel electrode may include a first branch part and a second branch part that is spaced from and electrically connected to the first branch part. The first common electrode portion may include a first part, a second part, and a third part. The first part may overlap the first branch part in a direction perpendicular to the substrate. The second part may overlap the second branch part in the direction. The third part may be positioned between the first part and the second part and may not overlap the first sub-pixel electrode in the direction.

The display device may include the following elements: a second common electrode portion spaced from the first common electrode portion, electrically connected to the first common electrode portion (for receiving the same common voltage), and positioned between the second substrate portion and the second roof layer; and a first connector positioned between the first common electrode portion and the second common electrode portion and configured to electrically connect the first sub-pixel electrode to the first transistor.

The first sub-pixel electrode may include a protrusion that overlaps the third substrate portion. The first connector may be positioned between the third substrate portion and the protrusion in a direction perpendicular to the substrate.

A length of the first connector in a direction perpendicular to the substrate may be greater than a thickness of the first liquid crystal set in the direction. The first connector may extend through at least one of an insulating layer, a light blocking layer, and a passivation layer. The insulating layer and/or the passivation layer may overlap the first liquid crystal set.

The display device may include a second liquid crystal set. The second common electrode portion may be positioned between the second substrate portion and the second liquid crystal set. The first connector may be positioned between the first liquid crystal set and the second liquid crystal set.

The display device may include the following elements: a gate line configured to transmit a gate signal to the first transistor; a second sub-pixel electrode positioned between the second common electrode and the second roof layer; a second transistor that overlaps the third substrate portion; and a second connector positioned between the first common electrode portion and the second common electrode portion and configured to electrically connect the second sub-pixel electrode to the second transistor. The second connector may be aligned with the first connector in a direction that is at an acute angle with respect to an extension direction of the gate line.

The display device may include the following elements: a second transistor that overlaps the third substrate portion; a second liquid crystal set spaced from the first liquid crystal set; a second sub-pixel electrode positioned between the second liquid crystal set and the second roof portion and electrically connected to the second transistor; and an overcoat overlapping the substrate and including two overcoat portions that are substantially perpendicular to the substrate and are positioned between the first sub-pixel electrode and the second sub-pixel electrode in a cross-sectional view of the display device.

The display device of may include an overcoat that includes a first overcoat portion and a second overcoat portion. The first roof layer may be positioned between the first substrate portion and the first overcoat portion. The second overcoat portion may overlap the third substrate portion. A (minimum) distance between the first substrate portion and the first common electrode portion is less than a (minimum) distance between the third substrate portion and the second overcoat portion.

The display device may include the following elements: a second common electrode portion spaced from the first common electrode portion, electrically connected to the first common electrode portion (for receiving the same common voltage), and positioned between the second substrate portion and the second roof layer; and an insulating material portion positioned between the first common electrode portion and the second common electrode portion and positioned between the third substrate portion and the second overcoat portion.

An embodiment of the present invention may be related to a method for manufacturing a display device. The method may include the following steps: preparing a substrate that includes a first substrate portion, a second substrate portion, and a third substrate portion positioned between the first substrate portion and the second substrate portion; forming a first transistor that overlaps the third substrate portion; forming a first common electrode portion that overlaps the first substrate portion; after the first common electrode portion has been formed, forming a first sub-pixel electrode that overlaps the first common electrode portion and is electrically connected to the first transistor; forming a first roof layer and a second roof layer substantially simultaneously, wherein the first roof layer and the second roof layer may be formed of the same material, wherein the first roof layer may overlap the first substrate portion, and wherein the second roof layer may overlap the second substrate portion and may be spaced from the first roof layer; providing a first liquid crystal set between the first common electrode portion and the first sub-pixel electrode, such that the first common electrode portion is positioned between the first substrate portion and the first liquid crystal set, and such that the first sub-pixel electrode is positioned between the first liquid crystal set and the first roof layer.

The method may include the following steps: forming a second transistor that overlaps the third substrate portion; when the first sub-pixel electrode is formed, forming a second sub-pixel electrode; and providing the first liquid crystal set through a gap between the first sub-pixel electrode and the second sub-pixel electrode before providing the first liquid crystal set into a space between the first common electrode portion and the first sub-pixel electrode.

The method may include the following steps: when the first common electrode portion is formed, forming a second common electrode portion that is spaced from the first common electrode portion and is electrically connected to the first common electrode portion; and forming a first connector that is positioned between the first common electrode portion and the second common electrode portion and is configured to electrically connect the first sub-pixel electrode to the first transistor.

The first sub-pixel electrode may be formed of a pixel electrode material. The first connector may be formed of the same pixel electrode material.

The first sub-pixel electrode may be formed in a pixel electrode forming process step. The first connector is formed in the same pixel electrode forming process step.

A length of the first connector in a direction perpendicular to the substrate may be greater than a thickness of the first liquid crystal set in the direction.

The method may include the following step: providing a second liquid crystal set, such that the second common electrode portion is positioned between the second substrate portion and the second liquid crystal set, and such that the first connector is positioned between the first liquid crystal set and the second liquid crystal set.

The method may include the following steps: forming a second transistor that overlaps the third substrate portion; forming a second sub-pixel electrode that is electrically connected to the second transistor; providing a second liquid crystal set spaced from the first liquid crystal set, such that the second sub-pixel electrode is positioned between the second liquid crystal set and the second roof portion; and forming an overcoat that overlaps the substrate and includes two overcoat portions that are substantially perpendicular to the substrate and are positioned between the first sub-pixel electrode and the second sub-pixel electrode in a cross-sectional view of the display device.

The method may include the following step: forming an overcoat that includes a first overcoat portion and a second overcoat portion. The first roof layer may be positioned between the first substrate portion and the first overcoat portion. The second overcoat portion may overlap the third substrate portion. A distance between the first substrate portion and the first common electrode portion may be less than a distance between the third substrate portion and the second overcoat portion.

The method may include the following steps: when the first common electrode portion is formed, forming a second common electrode portion that is spaced from the first common electrode portion and is electrically connected to the first common electrode portion; and forming an insulating material portion between the first common electrode portion and the second common electrode portion, The overcoat is formed such that the insulating material portion is positioned between the third substrate portion and the second overcoat portion.

An embodiment of the present invention may be related to a display device that may include the following elements: a substrate that includes a plurality of pixel areas; a thin film transistor formed on the substrate; a first insulating layer disposed on the thin film transistor; a common electrode disposed on the first insulating layer; a pixel electrode spaced apart from the common electrode and connected to the thin film transistor; a second insulating layer disposed on the pixel electrode; a roof layer disposed on the second insulating layer; a liquid crystal layer positioned between the common electrode and the pixel electrode, wherein the common electrode is positioned between the liquid crystal layer and the substrate, and wherein the pixel electrode is positioned between the liquid crystal layer and the roof layer; and an overcoat disposed on the roof layer and contacts the liquid crystal layer.

The pixel electrode may include a minute branch part, and the common electrode may have a planar shape.

The display device may include a connector that may extend longer than a thickness of the liquid crystal layer. The pixel electrode may be connected to the thin film transistor through the connector.

A liquid crystal injection channel may be disposed between two neighboring liquid crystal layers. The connector may be disposed in the liquid crystal injection channel.

The connector may be disposed closer to the liquid crystal layer than to a neighboring liquid crystal layer.

Portions of the common electrode may be disposed in pixel areas that are adjacent to each other in a column direction or a row direction and may be connected to each other for receiving the same common voltage.

Liquid crystal layers may be arranged in a rectangular array or matrix, and first-type valleys (or first valleys) may be formed between liquid crystal layers that are disposed in neighboring rows.

Connectors may be formed adjacent to two sides of a first valley.

The second insulating layer may be formed of at least one of silicon nitride, silicon oxide, and silicon oxynitride.

The display device may further include a third insulating layer formed on the roof layer. The third insulating layer may be formed of at least one of silicon nitride, silicon oxide, and silicon oxynitride.

An embodiment of the present invention may be related to a manufacturing method of a display device. The method may include the following steps: forming a thin film transistor on a substrate; forming a first insulating layer on the thin film transistor; forming a common electrode on the first insulating layer; forming a sacrificial layer on the common electrode; forming a pixel electrode including or connected to a connector that is connected to the thin film transistor, on the sacrificial layer; forming a second insulating layer on the pixel electrode; forming a roof layer by applying an organic material on the second insulating layer and patterning the second insulating layer; forming a hole to expose the sacrificial layer; forming a microcavity between the common electrode and the pixel electrode by removing the exposed sacrificial layer; forming a liquid crystal layer by injecting a liquid crystal material into the microcavity; and sealing the microcavity by forming an overcoat on the roof layer.

The connector may be formed of the same material as the pixel electrode, and the connector may extend longer than the height of the microcavity to connect to the thin film transistor.

The connector may be formed closer to the microcavity than to a neighboring microcavity.

Injection holes may be formed at two opposite edges of the microcavity. The connector may be disposed in a liquid crystal injection channel that is connected to the injection holes.

The pixel electrode may include a minute branch part, and the common electrode may have a planar shape.

Portions of the common electrode may be disposed in pixel areas adjacent to each other in a column direction or a row direction and may be connected to each other.

Microcavities may be disposed/arranged in a rectangular array or matrix, and first-type valleys (or first valleys) may be formed between microcavities that are disposed in neighboring rows.

Connectors may be formed adjacent to two sides of a first valley.

The second insulating layer may be formed of at least one of silicon nitride, silicon oxide, and silicon oxynitride.

The method may further include forming a third insulating layer on the roof layer, and the third insulating layer may be formed of at least one of silicon nitride, silicon oxide, and silicon oxynitride.

DETAILED DESCRIPTION OF THE EMBODIMENTS

Figure 1:
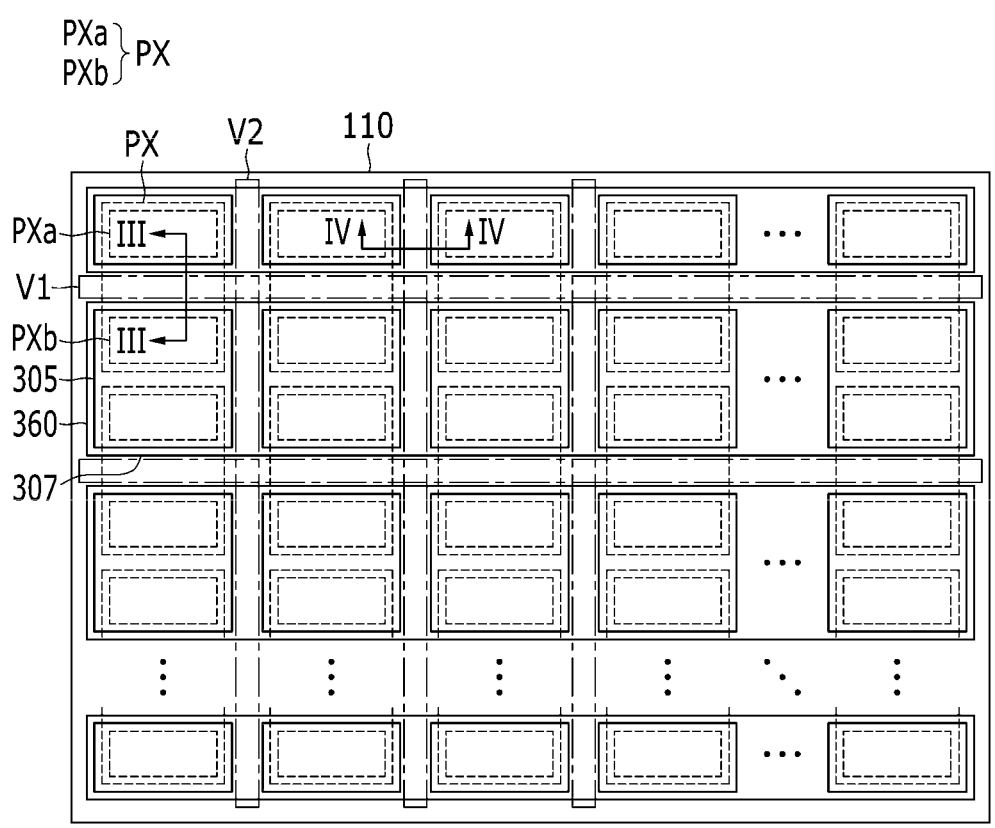
FIG. 1 is a schematic top plan view illustrating a display device according to an embodiment of the present invention.

Embodiments of the present invention are described with reference to the accompanying drawings. As those skilled in the art would realize, the described embodiments may be modified in various different ways, all without departing from the spirit or scope of the present invention.

In the drawings, the thicknesses of layers, films, panels, regions, etc., may be exaggerated for clarity. Like reference numerals may designate like elements in the specification. When a first element (such as a layer, film, region, or substrate) is referred to as being "on" a second element, the first element can be directly on the second element, or one or more intervening elements may also be present. In contrast, when a first element is referred to as being "directly on" a second element, there are no intended intervening elements between the first element and the second element.

Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the description, the term "connect" may mean "electrically connect"; the term "insulate" may mean "electrically insulate"

FIG. 1 is a schematic top plan view illustrating a display device according to an embodiment of the present invention. For clarity, some known elements may not be illustrated in FIG. 1.

The display device may include a substrate 110 (e.g., a glass or plastic substrate) and roof layers 360 formed on the substrate 110.

The display device (or the substrate 110) includes a plurality of pixel areas PX. The pixel areas PX are arranged in a matrix (or array) that may include a plurality of pixel rows and a plurality of pixel columns. Each pixel area PX may include a first sub-pixel area PXa (or first-type sub-pixel area PXa) and a second sub-pixel area PXb (or second-type sub-pixel area PXb). First sub-pixel areas PXa and second sub-pixel areas PXb may be substantially aligned in a longitudinal direction.

A first valley V1 (or first-type valley V1) is formed along a pixel row direction between a first sub-pixel area PXa and a second sub-pixel area PXb. A second valley V2 (or second-type valley V2) is located between two immediately neighboring pixel columns.

The roof layers 360 are formed in a pixel row direction. Injection holes 307 may be formed at edges of first valleys V1 under roof layers 360 for facilitating injection of liquid crystal material.

The roof layers 360 are spaced from the substrate 110 at locations between adjacent second valleys V2, so that microcavities 305 may be formed to accommodate the liquid crystal material. Portions of the roof layers 360 in the second valleys V2 may be attached to the substrate 110 and may cover the microcavities 305.

The structure described above is merely an example among various embodiments of the present invention. In an embodiment, roof layers 360 may be connected to each other at first valleys V1, some of the roof layers 360 may be spaced from the substrate 110 at second valleys V2, and adjacent microcavities 305 may be connected to each other.

Figure 2:
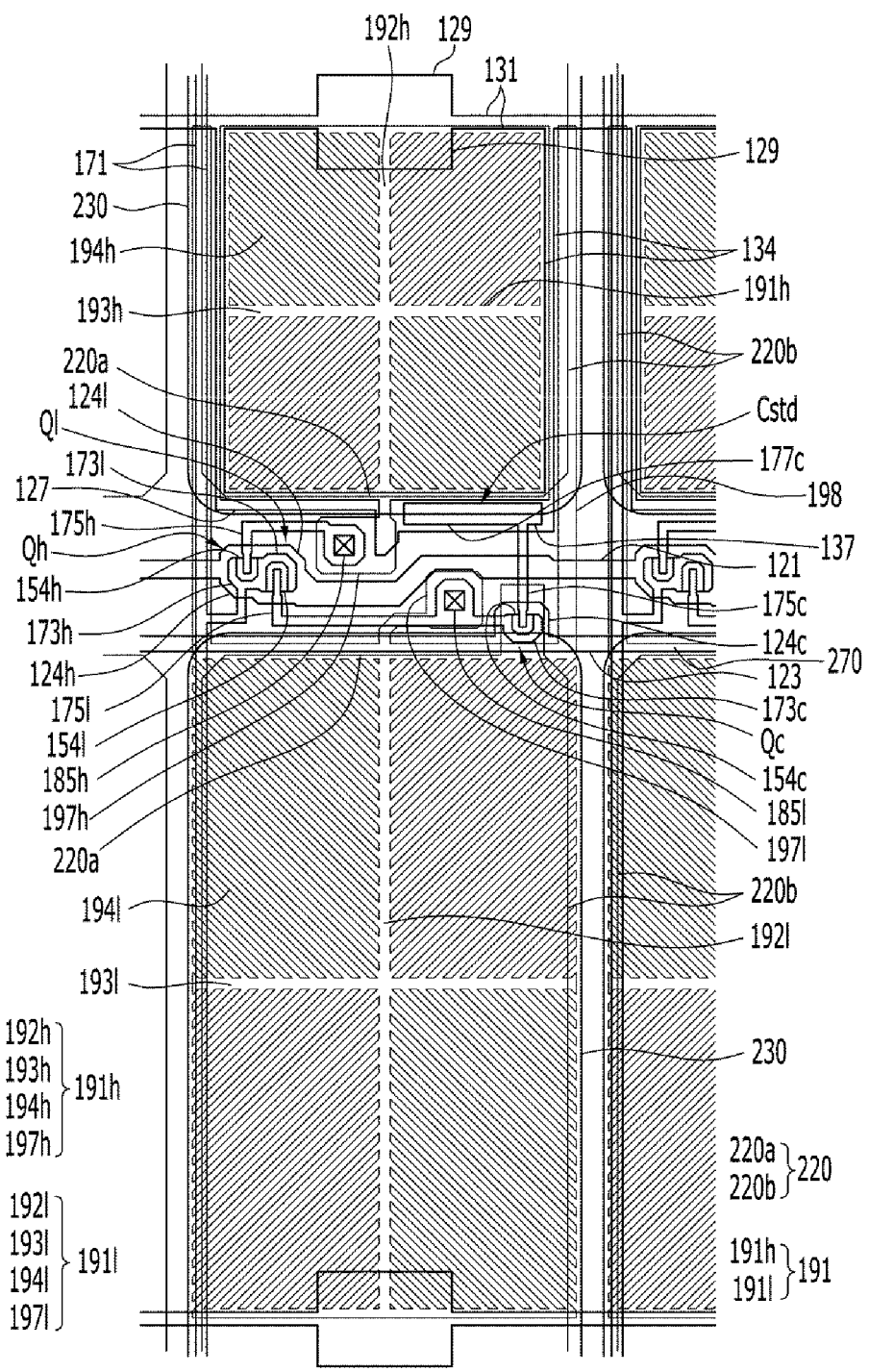
FIG. 2 is a schematic plan view (or layout view) illustrating a pixel of a display device according to an embodiment of the present invention.
Figure 3:
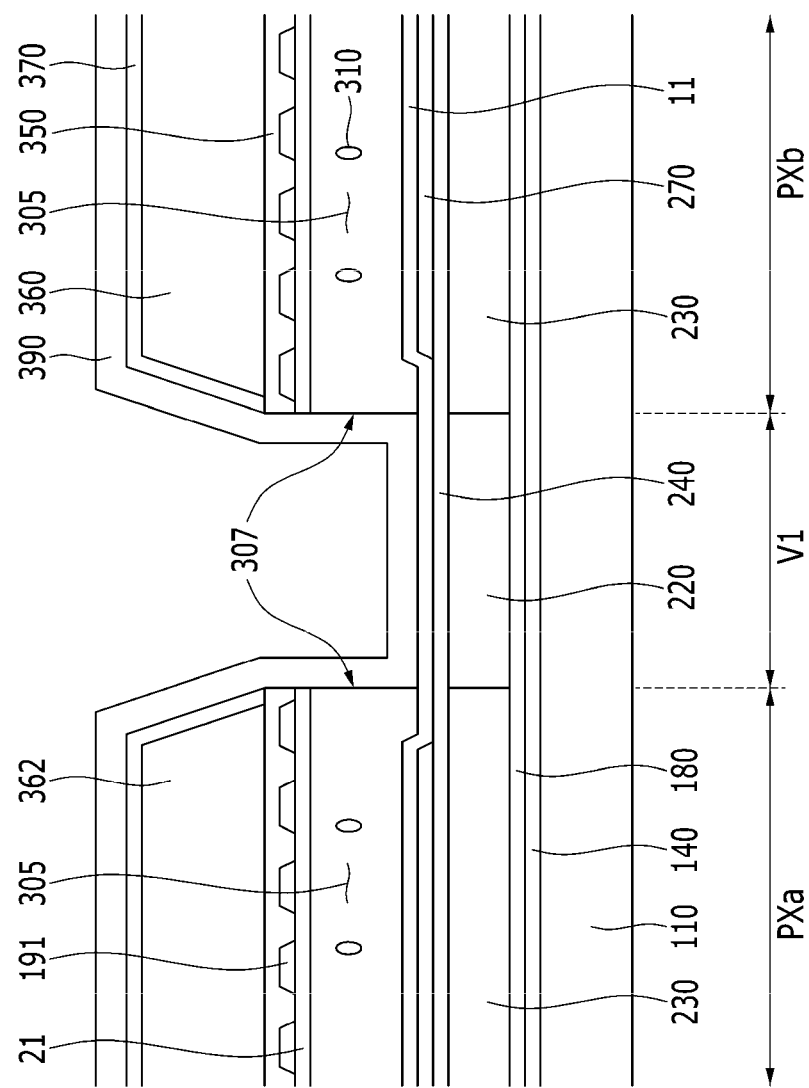
FIG. 3 is a schematic cross-sectional view taken along the line III-III indicated in FIG. 1 according to an embodiment of the present invention.
Figure 4:
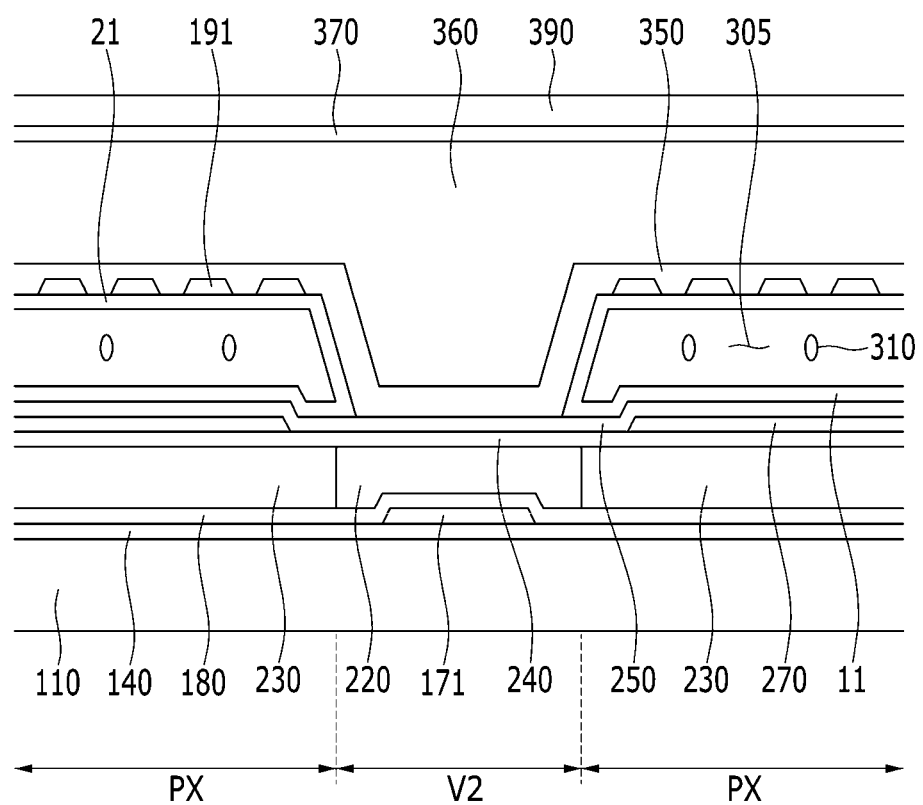
FIG. 4 is a schematic cross-sectional view taken along the line IV-IV indicated in FIG. 1 according to an embodiment of the present invention.
Figure 5:
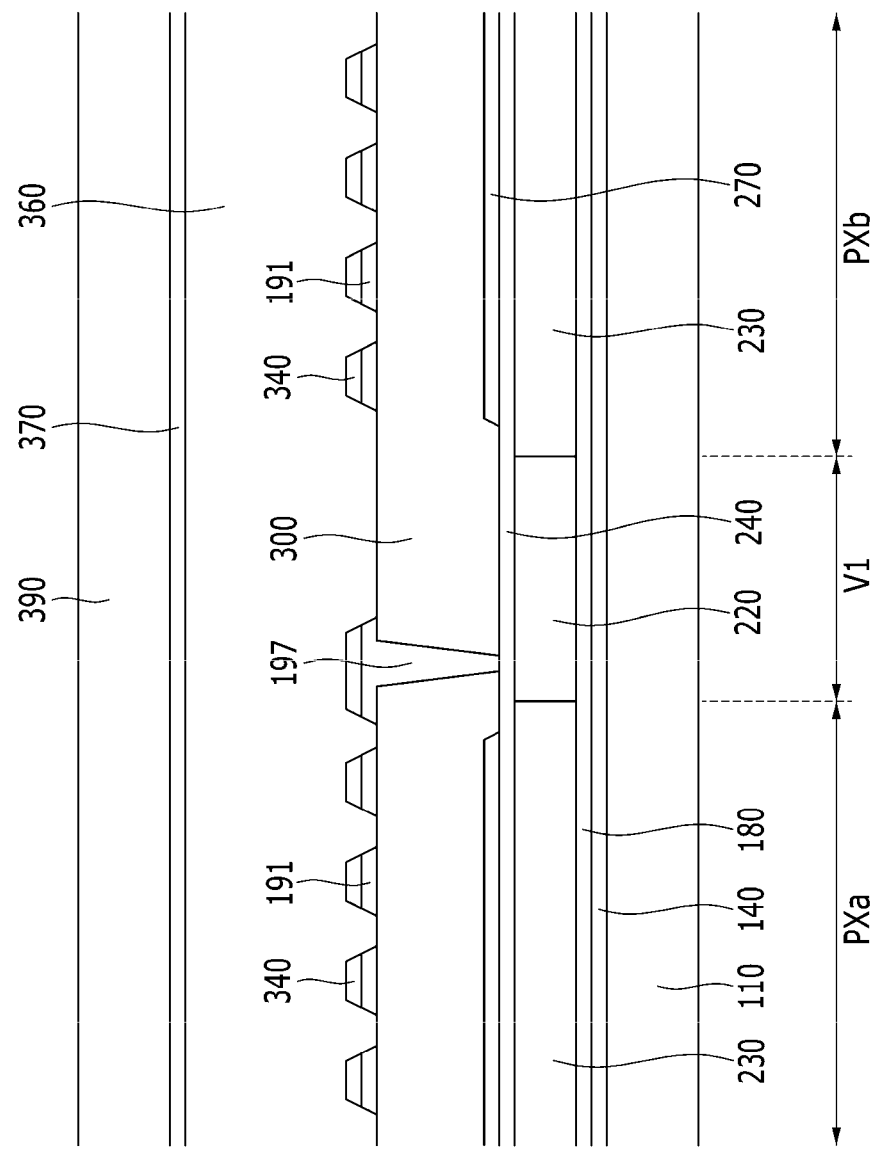
FIG. 5 is a schematic cross-sectional view of a pixel area of an intermediate structure formed in a manufacturing process of a display device according to an embodiment of the present invention.
Figure 6:
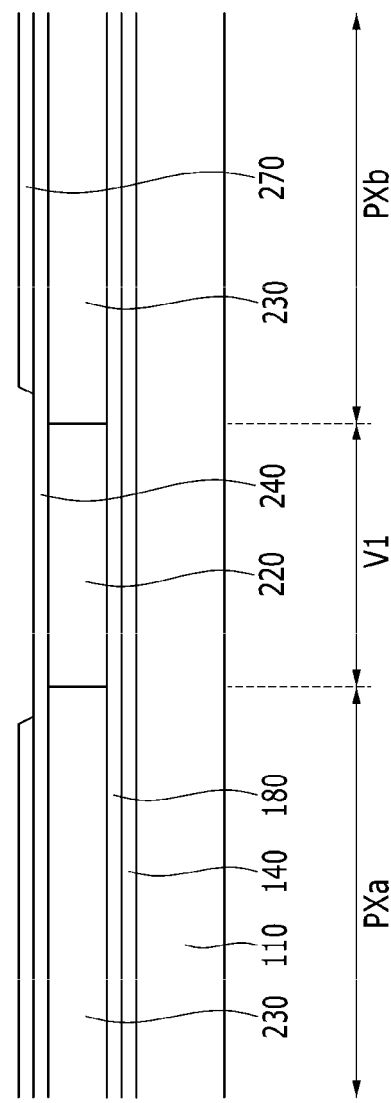
FIGS. 6 to 10 are schematic cross-sectional views (e.g., taken along lines corresponding to the line III-III indicated in FIG. 1) illustrating structures related to a manufacturing process of a display device according to an embodiment of the present invention.

FIG. 2 is a schematic top plan view illustrating a pixel of a display device (e.g., the display device discussed with reference to FIG. 1) according to an embodiment of the present invention. FIG. 3 is a schematic cross-sectional view taken along the line III-III indicated in FIG. 1 according to an embodiment of the present invention. FIG. 4 is a schematic cross-sectional view taken along the line IV-IV indicated in FIG. 1 according to an embodiment of the present invention, and FIG. 5 is a cross-sectional view of a pixel area of an intermediate structure formed in a manufacturing process of a display device according to an embodiment of the present invention.

Referring to FIGS. 1 to 5, a plurality of gate conductors is formed on the substrate 110. The gate conductors may include a plurality of gate lines 121, a plurality of voltage step-down gate lines 123, and a plurality of storage electrode lines 131. The gate lines 121 and the voltage step-down gate lines 123 mainly extend in a horizontal direction (or pixel row direction parallel to a first valley V1) and may transmit gate signals.

The gate conductors may further include a first gate electrode 124h and a second gate electrode 124l that protrude substantially upward and downward, respectively, from the gate line 121. The gate conductors may include a third gate electrode 124c that protrudes upward from the voltage step-down gate line 123. The first gate electrode 124h and the second gate electrode 124l are connected to and substantially aligned each other in the pixel column direction and may form an enlarged portion of the gate line 121. The gate electrodes 124h, 124l, and 124c may have one or more other protrusion configurations.

The storage electrode line 131 mainly extends in a horizontal direction (e.g., the pixel row direction) and may transmit a predetermined voltage, such as a common voltage. The storage electrode line 131 includes a storage electrode 129 that protrudes upward and downward, a pair of vertical parts 134 that extends toward the gate line 121 and extends substantially vertical to the gate line 121, and a horizontal part 127 that connects ends of the vertical parts 134. The horizontal part 127 includes a capacitive electrode 137 that extends toward the gate line 121.

A gate insulating layer 140 is formed on (and may cover) the gate conductors 121, 123, 124h, 124l, 124c, and 131. The gate insulating layer 140 may be formed of an inorganic insulating material, such as silicon nitride (SiNx) and/or silicon oxide (SiOx). The gate insulating layer 140 may have a single layer structure or a multilayer structure.

A first semiconductor 154h, a second semiconductor 154l, and a third semiconductor 154c are formed on the gate insulating layer 140. The first semiconductor 154h may be disposed on the first gate electrode 124h, the second semiconductor 154l may be disposed on the second gate electrode 124l, and the third semiconductor 154c may be disposed on the third gate electrode 124c. The first semiconductor 154h and the second semiconductor 154l may be connected to each other and the second semiconductor 154l and the third semiconductor 154c may be connected to each other. The first semiconductor 154h may extend below the data line 171. The semiconductors 154h, 154l, and 154c may be formed of amorphous silicon, polycrystalline silicon, and/or metal oxide.

Ohmic contacts (not illustrated) may be formed on the semiconductors 154h, 154l, and 154c, respectively. The ohmic contacts may be formed of a material such as silicide or n+ hydrogenated amorphous silicon with highly doped n-type impurity.

The pixel may be associated with a plurality of data conductors that includes a data line 171, a first (or first-type) source electrode 173h, a second (or second-type) source electrode 173l, a third (or third-type) source electrode 173c, a first (or first-type) drain electrode 175h, a second (or second-type) drain electrode 175l, and a third (or third-type) drain electrode 175c. Some of the data conductors may be formed on the semiconductors 154h, 154l, and 154c.

The data line 171 may transmit a data signal. The data line 171 mainly extends in a vertical direction (e.g., the pixel column direction) and may intersect the gate line 121 and the voltage step-down gate line 123. The data line 171 may include (or may be connected to) a first source electrode 173h and a second source electrode 173l, which extend toward (and/or correspond to) the first gate electrode 124h and the second gate electrode 124l, respectively, and are connected to each other.

Each of the first drain electrode 175h, the second drain electrode 175l, and the third drain electrode 175c includes a relatively wide (end) portion and a relatively narrow rod-shaped (end) portion. The rod-shaped portions of the first drain electrode 175h and the second drain electrode 175l are partially enclosed by the first source electrode 173h and the second source electrode 173l, respectively. The relatively wide portion of the second drain electrode 175l is connected to a third source electrode 173c, which may be U-shaped. The relatively wide portion 177c of the third drain electrode 175c overlaps the capacitive electrode 137 to form a voltage step-down capacitor Cstd. The rod-shaped portion of the third drain electrode 175c is partially enclosed by the third source electrode 173c.

The first gate electrode 124h, the first source electrode 173h, the first drain electrode 175h, and the first semiconductor 154h form a first thin film transistor Qh. The second gate electrode 124l, the second source electrode 173l, the second drain electrode 175l, and the second semiconductor 154l form a second thin film transistor Ql. The third gate electrode 124c, the third source electrode 173c, the third drain electrode 175c, and the third semiconductor 154c form a third thin film transistor Qc.

The first semiconductor 154h, the second semiconductor 154l, and the third semiconductor 154c may be linearly connected to each other. One or more of the semiconductors 154h, 154l, and 154c may have substantially the same planar shape as one or more of the data conductors 173h, 173l, 173c, 175h, 175l, and 175c and/or one or more of the associated ohmic contacts, except one or more channel regions between one or more of the source electrodes 173h, 173l, and 173c and one or more of the drain electrodes 175h, 175l, and 175c.

The first semiconductor 154h has a portion that is not blocked (or covered) by the first source electrode 173h and the first drain electrode 175h and is exposed between the first source electrode 173h and the first drain electrode 175h (in a plan view of the display device). The second semiconductor 154l has a portion that is not blocked (or covered) by the second source electrode 173l and the second drain electrode 175l and is exposed between the second source electrode 173l and the second drain electrode 175l (in a plan view of the display device). The third semiconductor 154c has a portion that is not blocked by the third source electrode 173c and the third drain electrode 175c and is exposed between the third source electrode 173c and the third drain electrode 175c (in a plan view of the display device).

A passivation layer 180 is formed on the data conductors 171, 173h, 173l, 173c, 175h, 175l, and 175c and portions of the semiconductors 154h, 154l, and 154c that are exposed between the source electrodes 173h, 173l, and 173c and the drain electrodes 175h, 175l, and 175c. The passivation layer 180 may be formed of an organic insulating material or an inorganic insulating material and may have a single layer structure or a multilayer structure.

A color filter 230 is formed in a pixel area PX on the passivation layer 180. Each of the color filters 230 may represent one of three primary colors, such as red, green, and blue, and/or may display white. In an embodiment, a color filter 230 may represent one of cyan, magenta, yellow, and white. In an embodiment, a color filter 230 may extend in a column direction between immediately adjacent data lines 171.

A light blocking member 220 is formed in a region between immediately adjacent color filters 230 and/or between separated portions of color filters. The light blocking member 220 may overlap at least a border of pixel areas PX and may overlap thin film transistors to prevent light leakage. A color filter 230 (or a portion of a color filter 230) may be formed in each of a first sub-pixel area PXa and a second sub-pixel area PXb. A portion of the light blocking member 220 may be formed between the first sub-pixel area PXa and the second sub-pixel area PXb to cover thin film transistors.

The light blocking member 220 includes a horizontal light blocking member 220a that extends along the gate line 121 and the voltage step-down gate line 123 and has a sufficiently width for substantially covering the first thin film transistor Qh, the second thin film transistor Ql, and the third thin film transistor Qc. The light blocking member 220 further includes a vertical light blocking member 220b that extends along the data line 171. The horizontal light blocking member 220a may overlap and/or may be formed in a first valley V1. The vertical light blocking member 220b may overlap and/or may be formed in a second valley V2. The color filter 230 and the light blocking member 220 may overlap and/or directly contact each other and may both directly contact the passivation layer 180.

A first insulating layer 240 (or first-type insulating layer 240) may be formed on the color filter 230 and the light blocking member 220. The first insulating layer 240 may be formed of an inorganic insulating material such as silicon nitride (SiNx), silicon oxide (SiOx), or silicon oxynitride (SiOxNy). The first insulating layer 240 functions to protect the color filter 230 and the light blocking member 220 (which may be formed of an organic material). The first insulating layer 240 may be omitted.

A first contact hole 185h (or first-type contact hole 185h) and a second contact holes 185l (or second-type contact hole 185l) are formed in the first insulating layer 240, the light blocking member 220, and the passivation layer 180 to expose the relatively wide potion of the first drain electrode 175h and the relatively wide portion of the second drain electrode 175l, respectively.

A common electrode 270 is formed on and directly contacts the first insulating layer 240. The common electrode 270 may be formed of a transparent metal material such as indium tin oxide (ITO) or indium zinc oxide (IZO).

Different portions of the common electrode 270 may be disposed in different pixel areas, may be connected to each other in a row direction and/or a column direction, and may receive a predetermined voltage.

The common electrode 270 may have a planar shape, may substantially cover the entire surface of the substrate 110, and may include opening regions corresponding to the contact holes 185l and 185h for enabling pixel electrodes to be connected to thin film transistors.

Each pixel area PX may correspond to a pixel electrode 191. Each pixel electrode 191 may overlap the common electrode 270 and may be spaced from the common electrode 270 with a predetermined distance. A microcavity 305 is formed between each pixel electrode 191 and the common electrode 270. A microcavity 305 may be enclosed by the associated pixel electrode 191, the common electrode 270, etc. A width and an area of a microcavity 305 may be configured according to a size and a resolution of the display device.

A pixel electrode 191 may be formed of a transparent metal material such as indium tin oxide (ITO) or indium zinc oxide (IZO). A suitable voltage may be applied to a pixel electrode 191 for forming an electric field with the common electrode 270 (to which the predetermined voltage is applied).

A pixel electrode 191 may include a first (or first-type) sub-pixel electrode 191h and a second (or second-type) sub-pixel electrode 191l that may be disposed in a first sub-pixel area PXa and a second sub-pixel area PXb, respectively, and may be substantially aligned with each other in a pixel column direction. A first valley V1, a gate line 121, and/or a voltage step-down gate line 123 may be disposed between the first sub-pixel electrode 191h and the second sub-pixel electrode 191l in a plan view of the display device.

The first sub-pixel electrode 191h and the second sub-pixel electrode 191l are connected to the first drain electrode 175h and the second drain electrode 175l through the first contact hole 185h and the second contact hole 185l, respectively. Accordingly, when the first thin film transistor Qh and the second thin film transistor Ql are turned on, one or more data voltages may be applied to the first sub-pixel electrode 191h and the second sub-pixel electrode 191l from the first drain electrode 175h and the second drain electrode 175l.

In an embodiment, protrusions 197h and 197l of the sub-pixel electrodes 191h and 191l are connected to the drain electrodes 175h and 175l through connectors 197 disposed in the contact holes 185h and 185l, respectively. The connectors 197 may support pixel electrodes 191 and may support structural robustness of microcavities 305.

The connectors 197 may be formed substantially simultaneously with the pixel electrode 191 in a same process step. As illustrated in FIG. 5, the connectors 197 may have column shapes that conform with the contact holes 185h and 185l, through which the drain electrodes 175h and 175l are exposed. A pixel electrode 191 may be electrically and mechanically connected to the associated thin film transistors through the associated connectors 197.

A connector 197 may be disposed between two immediately neighboring microcavities 305 and/or between two immediately neighboring sets of liquid crystal molecules respectively disposed in the two microcavities 305. A connector 197 may be disposed near or at an edge of a microcavity 305 and/or near or at an injection hole 307. The injection hole 307 may be disposed at or near an edge of a first valley V1, and the connector 197 may be formed at or near the edge of the first valley V1 and may be partially block the injection hole 307.

In an embodiment, a plurality of connectors 197 may be formed along an edge of a microcavity 305 to provide structural support and to electrically connect the associated thin film transistor to the associated pixel electrode 191.

An overall shape of each of the first sub-pixel electrode 191$h$ and the second sub-pixel electrode 191$l$ may be substantially a quadrangle. The first sub-pixel electrode 191$h$ and the second sub-pixel electrode 191$l$ include cross-shaped stem parts. The cross-shaped stem parts include horizontal stem parts 193$h$ and 193$l$ and vertical stem parts 192$h$ and 192$l$ that intersect the horizontal stem parts 193$h$ and 193$l$, respectively. The first sub-pixel electrode 191$h$ and the second sub-pixel electrode 191$l$ may include a plurality of minute branch parts 194$h$ and 194$l$ and may include protrusions 197$h$ and 197$l$ that protrude from edges of the sub-pixel electrodes 191$h$ and 191$l$, respectively.

Each of the sub-pixel electrodes 191$h$ and 191$l$ of the pixel electrode 191 is divided into four sub regions by an associated one of the horizontal stem parts 193$h$ and 193$l$ and an associated one of the vertical stem parts 192$h$ and 192$l$. The minute branch parts 194$h$ and 194$l$ obliquely extend from the horizontal stem parts 193$h$ and 193$l$ and the vertical stem parts 192$h$ and 192$l$ at approximately 45 degree or 135 degrees with respect to the gate line 121 or the horizontal stem parts 193$h$ and 193$l$. In an embodiment, the extending directions of the minute branch parts 194$h$ and 194$l$ in two adjacent sub regions may be perpendicular to each other.

In the present embodiment, the first sub-pixel electrode 191$h$ may include an outer peripheral stem part that encloses at least some elements of the first sub-pixel electrode 191$h$. The second sub-pixel electrode 191$l$ may further include horizontal parts that are disposed in an upper end and a lower end of the second sub-pixel electrode 191$l$. The pixel electrode 191 may include left and right vertical parts 198 that are disposed at the left and the right of the first sub-pixel electrode 191$h$. The left and right vertical parts 198 may prevent capacitive coupling between the data line 171 and the first sub-pixel electrode 191$h$.

The shape of the pixel area, the structure of the thin film transistor, and the shape of the pixel electrode described above are examples, and variations may be implemented in various embodiments.

A first (or first-type) alignment layer 11 is formed on (and directly contacts) the common electrode 270. The first alignment layer 11 may directly contact a portion of the first insulating layer 240 that is not covered by the common electrode 270.

A second (or second-type) alignment layer 21 is formed below (and directly contacts) the pixel electrode 191 and is opposite the first alignment layer 11.

The first alignment layer 11 and the second alignment layer 21 may be vertical alignment layers and may be formed of an alignment material, such as polyamic acid, polysiloxane, or polyimide. The alignment layers 11 and 21 may be connected to each other at an edge of a pixel area PX.

A liquid crystal layer that includes a set of liquid crystal molecules 310 may be provided inside a microcavity 305 that is disposed between the pixel electrode 191 and the common electrode 270. The liquid crystal molecules 310 may have a negative dielectric anisotropy and may be aligned vertical to the substrate 110 when no electric field is applied.

The first sub-pixel electrode 191$h$ and the second sub-pixel electrode 191$l$ to which the data voltage is applied may generate an electric field together with the common electrode 270 to determine an orientation of the set of liquid crystal molecules 310. Luminance of light transmitted through the liquid crystal layer may substantially depend on the orientation of the liquid crystal molecule 310.

According to embodiments of the present invention, in a pixel area PX, the common electrode 270 and the associated pixel electrode 191 both extend substantially parallel to the substrate 110 without including field generating electrode portions that are substantially inclined with respect to the substrate 110. Therefore, the pixel electrode 191 and the common electrode 270 may generate an electric field that is substantially vertical to the substrate 110 with minimum or no distraction, such that the liquid crystal molecules 310 may be substantially oriented in a predetermined direction with minimum or no unwanted orientation. Advantageously, light leakage and/or image defects may be substantially minimized or prevented, and satisfactory image quality may be provided.

A second (or second-type) insulating layer 350 may be formed on the pixel electrode 191. The second insulating layer 350 may be formed of an inorganic insulating material, such as silicon nitride (SiNx), silicon oxide (SiOx), or silicon oxynitride (SiOxNy). In an embodiment, the second insulating layer 350 may be omitted.

The second insulating layer 350 may provide a planarized surface over the pixel electrode 191, which includes minute branch parts that may produce an uneven surface.

A roof layer 360 is formed on the second insulating layer 350. The roof layer 360 may be formed of an organic material. A microcavity 305 is formed below the roof layer 360. The roof layer 360 is hardened by a hardening (or curing) process to maintain the shape of the microcavity 305. The microcavity may be positioned between the roof layer 360 and the common electrode 270. A sub-pixel electrode 191$h$ or 191$l$ may be positioned between the microcavity 305 and the roof layer 360.

A roof layer 360 is formed in the pixel area PX and a second valley V2 along a pixel row but is not formed in a first valley V1. That is, the roof layer 360 is not formed between a first sub-pixel area PXa and a second sub-pixel area PXb. A microcavity 305 is formed below the roof layer 360 in each of a first sub-pixel area PXa and a second sub-pixel area PXb. In a second valley V2, a portion of a roof layer 360 may be positioned between two immediately neighboring microcavities 305. A thickness of the portion of the roof layer 306 that is disposed in the second valley V2 may be larger than a thickness of a portion of the roof layer 360 that is disposed in a first sub-pixel area PXa or a second sub-pixel area PXb. An upper surface and sides of a microcavity 305 may be covered by a roof layer 360.

An injection hole 307 is formed in at least one of a pixel electrode 191, the second insulating layer 350, and the roof layer 360 to expose a part of a microcavity 305. An injection hole 307 formed at an edge of a first sub-pixel area PXa may be opposite an injection hole 307 formed at an edge of a second sub-pixel area PXb. Opposite injection holes 307 may be formed to allow access to microcavities 305 correspondingly to a first sub-pixel area PXa and a second sub-pixel area PXb. An aligning agent and/or the liquid crystal material may be injected into a microcavity 305 through a corresponding injection hole 307.

An overcoat 390 may be formed on and/or may overlap at least one of the third insulating layer 370, the roof layer 360, the second insulating layer 350, pixel electrodes 191, and the common electrode 270. The overcoat 390 may cover injection holes 307 for sealing microcavities 305. Therefore, leakage of liquid crystal molecules 310 may be substantially prevented. The overcoat 390 may directly contact liquid crystal molecule 310 and may be formed of a material that does not substantially react with liquid crystal molecules 310. For example, the overcoat 390 may be formed of parylene.

The overcoat 390 may have a multilayer structure, such as a double layer structure or a triple layer structure. The double layer structure may consist of two layers that are formed of different materials. The triple layer structure may include three layers, wherein materials of adjacent layers are different from each other. For example, the overcoat 390 may include an organic insulating material layer and an inorganic insulating material layer.

Although not illustrated, a polarizer may be formed on at least one of an upper surface and a lower surface of the display device. A first polarizer may be attached onto the lower surface of the substrate 110, and a second polarizer may be attached onto the overcoat 390.

According to embodiments of the invention, the common electrode 270 is disposed between liquid crystal molecules 310 (or liquid crystal material), and a pixel electrode 191 is disposed between liquid crystal molecules 310 (or liquid crystal material) and the roof layer 360 and may include minute branch parts and a stem part. In a pixel area PX, the common electrode 270 and the associated pixel electrode 191 both extend substantially parallel to the substrate 110, and minimum or substantially no field generating electrode (portion) is inclined with respect to the substrate 110. Therefore, the pixel electrode 191 and the common electrode 270 may form a substantially vertical electric field. Advantageously, light leakage and/or image defects may be substantially minimized or prevented, and satisfactory image quality may be provided.

FIGS. 6 to 10 are schematic cross-sectional views illustrating structures related to a manufacturing method of a display device (e.g., the display device discussed with reference to FIGS. 1 to 5) according to an embodiment of the present invention.

According to the manufacturing method, on a substrate 110, which is formed of glass or plastic, a gate line 121 and a voltage step-down line 123 (which extend in one direction) are formed, and a first gate electrode 124h, a second gate electrode 124l, and a third gate electrode 124c (which protrude from the gate line 121) are formed.

Substantially simultaneously, a storage gate line 131 may be formed. The storage gate line 131 may be spaced from the gate line 121, the voltage step-down gate line 123, and the first to third gate electrodes 124h, 124l, and 124c.

Subsequently, a gate insulating layer 140 is formed, e.g., using an inorganic insulating material such as silicon oxide (SiOx) or silicon nitride (SiNx), on the entire surface of the substrate 110 and may cover the gate line 121, the voltage step-down gate line 123, the gate electrodes 124h, 124l, and 124c, and the storage electrode line 131. The gate insulating layer 140 may have a single layer structure or a multilayer structure.

Subsequently, a semiconductor material (such as amorphous silicon, polycrystalline silicon, or metal oxide) is deposited on the gate insulating layer 140 and is patterned to form a first semiconductor 154h, a second semiconductor 154l, and a third semiconductor 154c. The first semiconductor 154h may be disposed on the first gate electrode 124h, the second semiconductor 154l may be disposed on the second gate electrode 124l, and the third semiconductor 154c may be disposed on the third gate electrode 124c.

Subsequently, a metal material is deposited and then patterned to form a data line 171 that extends in another direction. The metal material may have a single layer structure or a multilayer structure.

Substantially simultaneously, a first source electrode 173h (which protrudes from the data line 171 onto the first gate electrode 124h) and a first drain electrode 175h (which is spaced from the first source electrode 173h) are formed. Substantially simultaneously, a second source electrode 173l (which is connected to the first source electrode 173h) and a second drain electrode 175l (which is spaced apart from the second source electrode 173l) are formed. Substantially simultaneously, a third source electrode 173c (which extends from the second drain electrode 175l) and a third drain electrode 175c (which is spaced apart from the third source electrode 173c) are formed.

Semiconductor material and the metal material may be sequentially deposited and then simultaneously patterned to form the semiconductors 154h, 154l, and 154c, the data line 171, the source electrodes 173h, 173l, and 173c, and the drain electrodes 175h, 175l, and 175c. In an embodiment, the first semiconductor 154h may extend below the data line 171.

The gate electrodes 124h, 124l, and 124c, the source electrodes 173h, 173l, and 173c, and the drain electrodes 175h, 175l, and 175c and the semiconductors 154h, 154l, and 154c may form the thin film transistors (TFT) Qh, Ql, Qc.

Subsequently, a passivation layer 180 is formed on the data line 171, the source electrodes 173h, 173l, and 173c, the drain electrodes 175h, 175l, and 175c, and the semiconductors 154h, 154l, and 154c, which are exposed between respective source electrodes 173h, 173l, and 173c and respective drain electrodes 175h, 175l, and 175c. The passivation layer 180 may be formed of an organic insulating material or an inorganic insulating material. The passivation layer 180 may have a single layer structure or a multilayer structure.

Subsequently, a color filter 230 is formed in each pixel area PX on the passivation layer 180. A color filter 230 or a portion of a color filter 230 may be formed in each first sub-pixel area PXa and each second sub-pixel area PXb. No color filter may be formed in a first valley V1. Color filters 230 having the same color may be formed along a column direction in columns of the plurality of pixel areas PX. In an embodiment, a color filter 230 having a first color is formed first, and then a mask is shifted to form a color filter 230 having a second color. Subsequently, the mask is shifted to form a color filter having a third color.

Subsequently, a light blocking member 220 may be formed at a border of the pixel areas PX and may be formed on the thin film transistors on the passivation layer 180. The light blocking member 220 may be formed in the first valley V1 disposed between a first sub-pixel area PXa and a second sub-pixel area PXb.

The light blocking member 220 may be formed at one or more edges of each pixel area PX. The light blocking member 220 may overlap a support member 197 that is subsequently formed.

In an embodiment, the light blocking member 220 is formed after the color filters 230 have been formed. In an embodiment, the light blocking member 220 may be formed before formation of the color filters 230.

Subsequently, a first insulating layer 240 is formed on the color filter 230 and the light blocking member 220 with an inorganic insulating material, such as silicon nitride (SiNx), silicon oxide (SiOx), or silicon oxynitride (SiOxNy).

Subsequently, the passivation layer 180, the light blocking member 220, and the first insulating layer 240 are etched to form a first contact hole 185h and a second contact hole 185l so as to expose a part of the first drain electrode 175h and so as to expose a part of the second drain electrode 175l.

Subsequently, a transparent metal material, such as indium tin oxide (ITO) or indium zinc oxide (IZO), is deposited on the first insulating layer 240 and then patterned to form a common electrode 270.

The common electrode 270 may have a planar shape and may not cover the contact holes 185h and 185l. In an embodiment, the common electrode 270 may be formed to have a planar shape, may overlap substantially the entire surface of the substrate 110, and may include opening regions corresponding to the contact holes 185l and 185h.

Portions of the common electrode 270 may be connected to each other in a row direction and/or column direction and may receive the same voltage.

Subsequently, referring to FIG. 7, a photosensitive organic material is applied on the common electrode 270 for forming a sacrificial layer 300 by a photo process.

Portions of the sacrificial layer 300 may be connected along pixel columns. The sacrificial layer 300 may cover a pixel area PX and may cover the first valley V1 disposed between the first sub-pixel area PXa and the second sub-pixel area PXb of the pixel area PX.

The sacrificial layer 300 may also include an opening region so as to expose the contact holes 185l and 185h.

Subsequently, a transparent metal material 190, such as indium tin oxide (ITO) or indium zinc oxide (IZO), is deposited on the sacrificial layer 300. Portions of the transparent metal material 190 may be provided inside the contact holes 185l and 185h through the above-described opening region.

Next, an inorganic insulating layer 340 may be formed of an inorganic insulating material such as silicon nitride (SiNx), silicon oxide (SiOx), or silicon oxynitride (SiOxNy) on the transparent metal material 190.

Subsequently, a photosensitive pattern 500 is formed on the inorganic insulating layer 340 for patterning the transparent metal material 190 to the pixel electrode 191.

Figure 7:
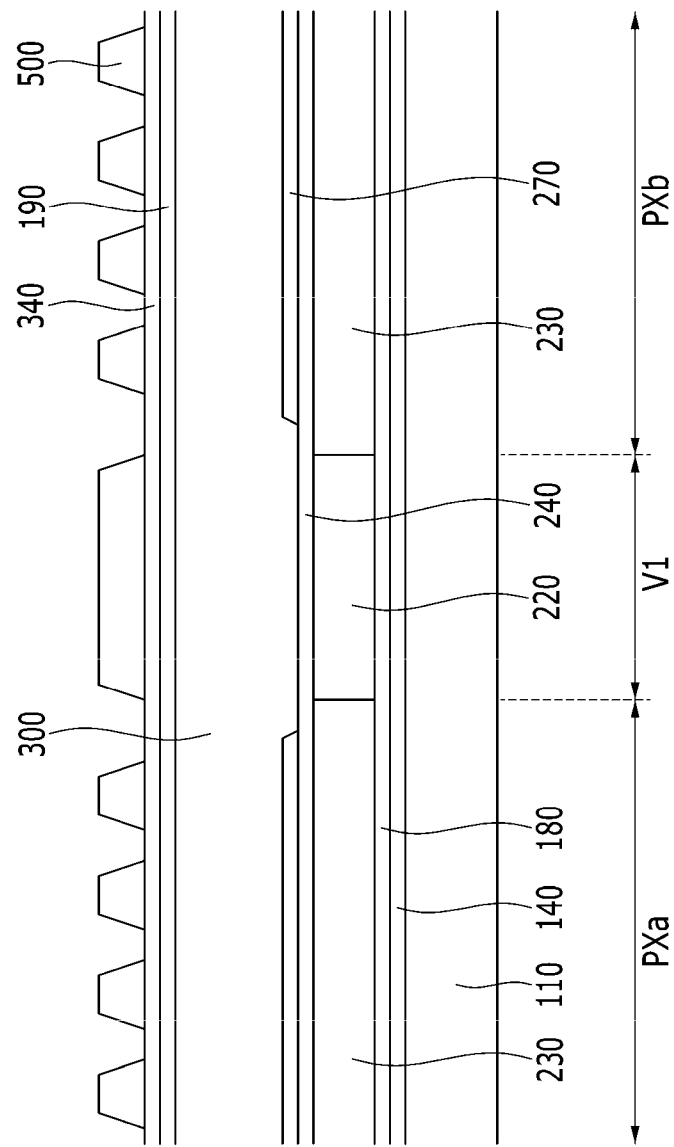
Figure 8:
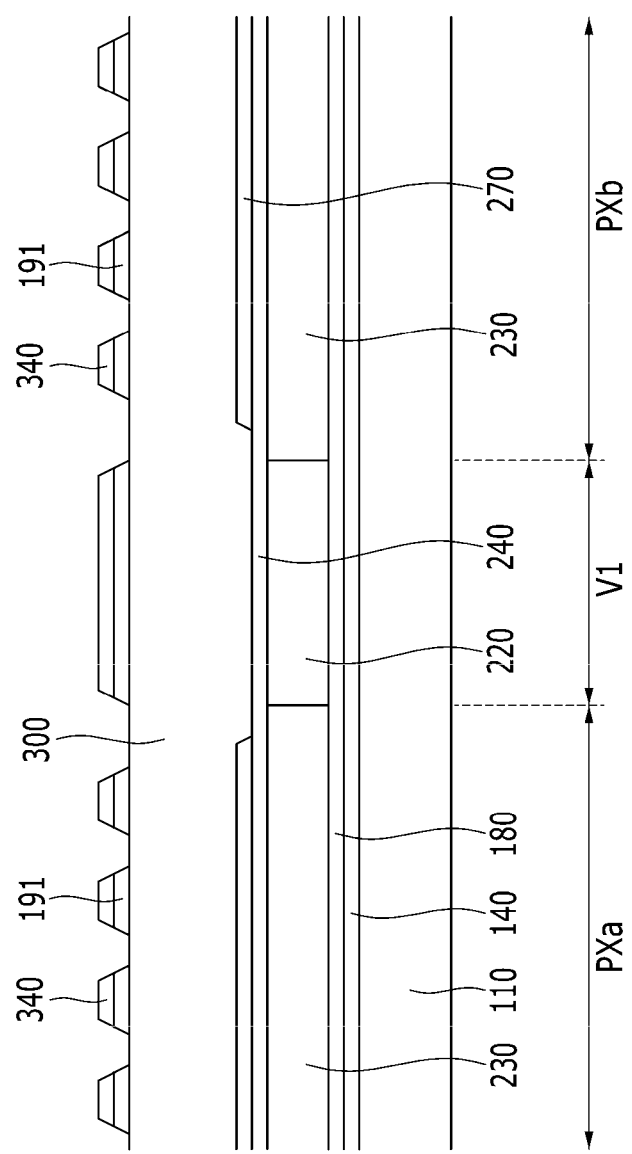

Referring to FIG. 7 and FIG. 8, the inorganic insulating layer 340 and the transparent metal material layer 190 are pattered with the photosensitive pattern 500 as a mask. In an embodiment, after the inorganic insulating layer 350 has been etched, the transparent metal material 190 is patterned to form a pixel electrode 191.

Specifically, a first sub-pixel electrode 191h is formed in a first sub-pixel area PXa and a second sub-pixel electrode 191l is formed in a second sub-pixel area PXb. The first sub-pixel electrode 191h and the second sub-pixel electrode 191l are separated from each other. The first sub-pixel electrode 191h may be connected to the first drain electrode 175h through the first contact hole 185h, and the second sub-pixel electrode 191l may be connected to the second drain electrode 175l through the second contact hole 185l.

Horizontal stem parts 193h and 193l and vertical stem parts 192h and 192l that intersect the horizontal stem parts 193h and 193l are formed in the first sub-pixel electrode 191h and the second sub-pixel electrode 191l, respectively. Further, a plurality of minute branch parts 194h and 194l that obliquely extends from the horizontal stem parts 193h and 193l and the vertical stem parts 192h and 192l is formed.

Portions of the transparent metal material 190 positioned inside the contact holes 185h and 185l may form connectors 197 that connect the sub-pixel electrodes 191h and 191l to the drain electrodes 175h and 175l, respectively.

The connectors 197 may be formed simultaneously with the pixel electrode 191 in a same process step. The connectors 197 may have column shapes that conform with the contact holes 185h and 185l, through which the drain electrodes 175h and 175l are exposed.

The connectors 197 may be formed in the opening regions formed in the sacrificial layer and the common electrode 270. Pixel electrodes 191 and corresponding thin film transistors may be mechanically and electrically connected to each other through the connectors 197.

A connector 197 may be disposed between two immediately neighboring microcavities 305 and/or between two immediately neighboring sets of liquid crystal molecules respectively disposed in the two microcavities 305. A connector 197 may support structural robustness of nearby microcavities 305. A connector 197 may be disposed near or at an edge of a microcavity 305 and/or near or at an injection hole 307. The injection hole 307 is disposed at or near an edge of a first valley V1, and the connector 197 may be formed at or near the edge of the first valley V1 and may partially block the injection hole 307.

In an embodiment, connectors 197 may be formed along an edge of a microcavity 305 to provide structural support and to electrically connect the corresponding thin film transistor to the corresponding pixel electrode 191.

Subsequently, referring to FIG. 9, a second insulating layer 350 having a flat surface is formed on the pixel electrodes 191, an organic material is applied on the second insulating layer 350, and the organic material is patterned to form roof layers 360. In this process step, portions of the organic material disposed in the first valleys V1 may be removed. As a result, the roof layers 360 may extend along the plurality of pixel rows.

A third (or third-type) insulating layer 370 may be formed of an inorganic insulating material, such as silicon nitride (SiNx), silicon oxide (SiOx), or silicon oxynitride (SiOxNy), on the roof layer 360.

In an embodiment, the third insulating layer 370 may not be formed.

Subsequently, referring to FIG. 8 and FIG. 9, a portion of the inorganic insulating layer 340 and a portion of pixel electrode 191 that overlap a first valley V1 are removed using the roof layer 360 as a mask to retain other portions.

Partially covered by the roof layer 360, the inorganic insulating layer 340 is dry-etched, and the pixel electrode 191 is then wet-etched.

The inorganic insulating layer 340 and the pixel electrode 191 are patterned using the roof layer 360 as a mask so that alignment error may be minimized or prevented.

Figure 9:
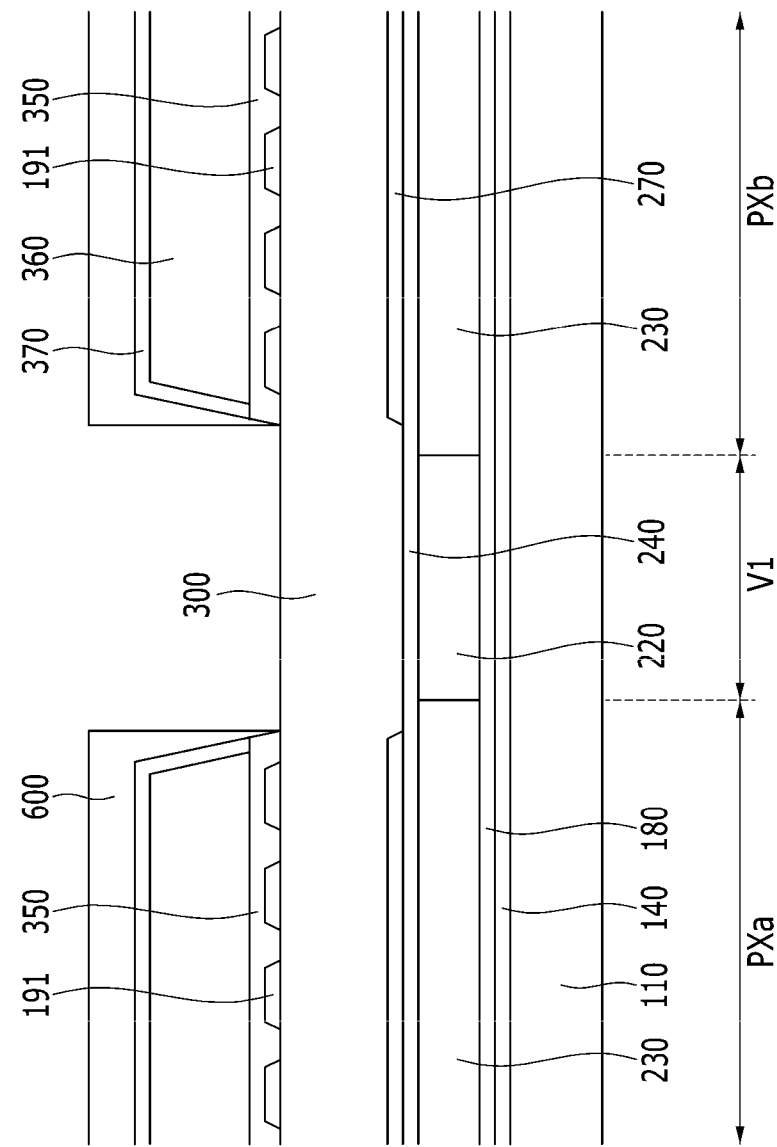
Figure 10:
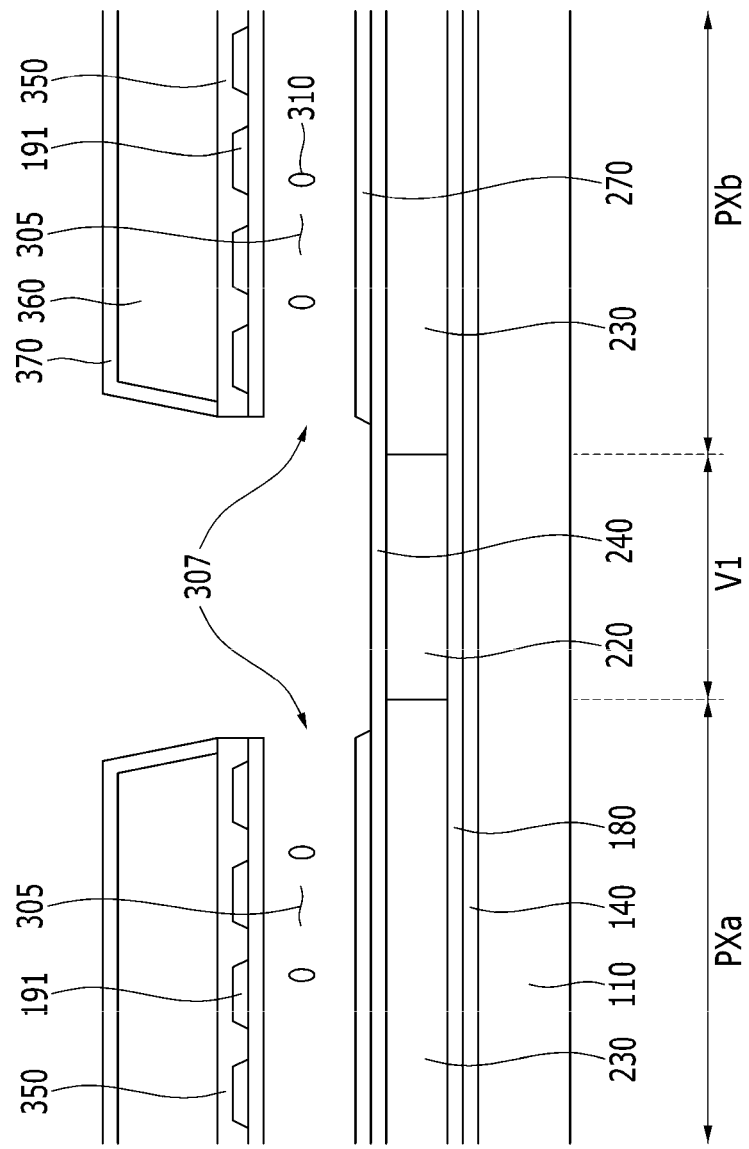

Referring to FIG. 9 and FIG. 10, a protective layer (or mask) 600 is disposed on the third insulating layer 370, and a development solution or stripper solution is supplied through exposed portions of the sacrificial layer 300 to substantially entirely remove the sacrificial layer 300. In an embodiment, an ashing process is used to substantially entirely remove the sacrificial layer 300.

After the sacrificial layer 300 has been removed, microcavities 305 are created in positions where the sacrificial layer 300 has been previously present.

A microcavity 305 is position between a pixel electrode 191 and the common electrode 270 and is positioned between the common electrode 270 and a roof layer 360.

The microcavity 305 is exposed through an injection hole 307 and an opening resulted from the removal of portions of the roof layer 360, the second insulating layer 350, and the pixel electrode 191. Injection holes 307 may be formed along a first valley V1. Injection holes 307 may be formed at opposite edges of a first sub-pixel area PXa and a second sub-pixel area PXb. In view of a standing orientation of the display device, injection holes 307 may be formed correspondingly to a lower edge of the first sub-pixel area PXa and an upper edge of the second sub-pixel area PXb. In an embodiment, injection holes 307 may be formed along a second valley V2.

Subsequently, the substrate 110 is heated to harden the roof layers 360. Therefore, the shape of the microcavities 305 may be maintained by the roof layers 360.

Subsequently, an aligning agent that contains an aligning material may be provided through a spin coating method or an inkjet method, such that the aligning agent may be injected into microcavities 305 through injection holes 307. hardening heating process may be performed after the aligning agent has been injected into the microcavities 305. As a result, a solvent component may be substantially evaporated, and the aligning material may remain on inner walls of the microcavities 305.

Accordingly, referring to FIG. 3 and FIG. 4, a first alignment layer 11 may be formed on the common electrode 270 and a second alignment layer 21 may be formed on each pixel electrode 191. The first alignment layer 11 and the second alignment layer 21 may be connected to each other at the edge of the corresponding pixel area PX.

In an embodiment, the alignment layers 11 and 21 may be configured to align liquid crystal molecules in a direction vertical to the substrate 110 (except at sides of the corresponding microcavity 305). In an embodiment, a UV light may be irradiated onto the alignment layers 11 and 21 to configure the alignment layers 11 and 21 for aligning liquid crystal materials in a direction horizontal to the substrate 110.

Subsequently, a liquid crystal material that includes liquid crystal molecules 310 may be provided through an inkjet method or a dispensing method, such that the liquid crystal material may be injected into the microcavity 305 through the injection hole 307. In an embodiment, the liquid crystal material may be injected through injection holes 307 formed along odd numbered first valleys V1 but may not be injected through injection holes 307 formed along even numbered first valleys V1. In an embodiment, the liquid crystal material may be injected through injection holes 307 formed along even numbered first valleys V1 but may not be injected through injection holes 307 formed along odd numbered first valleys V1.

When the liquid crystal material is provided at the odd numbered first valleys V1, the liquid crystal material may enter microcavities 305 through injection holes 307 formed along the odd numbered first valleys through capillary action. Air preexisting in the microcavities 305 may be discharged through injection holes 307 formed along the even numbered first valleys V1, so that the liquid crystal material may enter the microcavities 305 with minimum resistance.

In an embodiment, liquid crystal material may be injected through substantially all the injection holes 307. In an embodiment, liquid crystal material may be injected through injection holes 307 formed along odd numbered first valleys V1 and injection holes 307 formed along even numbered first valleys V1.

Referring to FIGS. 3 and 4, a material that does not substantially react with liquid crystal molecules 310 is deposited on the third insulating layer 370 to form an overcoat 390. The overcoat 390 may cover the injection hole 307 to seal the microcavity 305.

Subsequently, although not illustrated, a polarizer may be further attached onto at least one of an upper surface and a lower surface of the structure illustrated in FIG. 3 and FIG. 4. A first polarizer may be attached onto the lower surface of the substrate 110, and a second polarizer may be attached onto the overcoat 390.

According to embodiments of the present invention, a display device may require only one substrate. Advantageously, the weight, thickness, cost, and/or manufacturing time associated with the display device may be minimized.

According to embodiments of the present invention, in a display device, the common electrode and the pixel electrodes extend substantially parallel to the substrate, such that minimum or substantially no field generating electrode portions extend inclined with respect to the substrate. Accordingly, the pixel electrode and the common electrode may form an electric field that is substantially vertical to the substrate. Advantageously, light leakage and/or image defects may be substantially minimized or prevented, and satisfactory image quality may be provided.

While practical embodiments of this invention have been described, the invention is not limited to the described embodiments. This invention is intended to cover various modifications and equivalent arrangements included within the spirit and scope defined by the appended claims.

What is claimed is:
1. A display device comprising:
a substrate including a first substrate portion, a second substrate portion, and a third substrate portion positioned between the first substrate portion and the second substrate portion;
a first roof layer formed of a first material and overlapping the first substrate portion;
a second roof layer formed of the first material, spaced from the first roof layer, and overlapping the second substrate portion;
a first transistor overlapping the third substrate portion;
a first liquid crystal set positioned between the first substrate portion and the first roof layer and provided in a first microcavity;
a second liquid crystal set positioned between the second substrate portion and the second roof layer and provided in a second microcavity spaced from the first microcavity;
a first common electrode portion positioned between the first substrate portion and the first liquid crystal set;
a second common electrode portion positioned between the second substrate portion and the second liquid crystal set; and
a first sub-pixel electrode positioned between the first liquid crystal set and the first roof layer and electrically connected to the first transistor, wherein the third substrate portion does not overlap the first microcavity and the second microcavity.

2. The display device of claim 1,
wherein the first sub-pixel electrode includes a first branch part and a second branch part that is spaced from and electrically connected to the first branch part,
wherein the first common electrode portion includes a first part, a second part, and a third part,
wherein the first part overlaps the first branch part in a direction perpendicular to the substrate,
wherein the second part overlaps the second branch part in the direction, and
wherein the third part is positioned between the first part and the second part and does not overlap the first sub-pixel electrode in the direction.

3. The display device of claim 1, further comprising:
a second common electrode portion spaced from the first common electrode portion, electrically connected to the first common electrode portion, and positioned between the second substrate portion and the second roof layer; and
a first connector positioned between the first common electrode portion and the second common electrode portion and configured to electrically connect the first sub-pixel electrode to the first transistor.

4. The display device of claim 3,
wherein the first sub-pixel electrode includes a protrusion that overlaps the third substrate portion, and
wherein the first connector is positioned between the third substrate portion and the protrusion in a direction perpendicular to the substrate.

5. The display device of claim 3, wherein a length of the first connector in a direction perpendicular to the substrate is greater than a thickness of the first liquid crystal set in the direction.

6. The display device of claim 3, further comprising:
a second liquid crystal set,
wherein the second common electrode portion is positioned between the second substrate portion and the second liquid crystal set, and
wherein the first connector is positioned between the first liquid crystal set and the second liquid crystal set.

7. The display device of claim 3, further comprising:
a gate line configured to transmit a gate signal to the first transistor;
a second sub-pixel electrode positioned between the second common electrode and the second roof layer;
a second transistor that overlaps the third substrate portion; and
a second connector positioned between the first common electrode portion and the second common electrode portion and configured to electrically connect the second sub-pixel electrode to the second transistor,
wherein the second connector is aligned with the first connector in a direction that is at an acute angle with respect to an extension direction of the gate line.

8. The display device of claim 1, further comprising:
a second transistor that overlaps the third substrate portion;
a second liquid crystal set spaced from the first liquid crystal set;
a second sub-pixel electrode positioned between the second liquid crystal set and the second roof portion and electrically connected to the second transistor; and
an overcoat overlapping the substrate and including two overcoat portions that are substantially perpendicular to the substrate and are positioned between the first sub-pixel electrode and the second sub-pixel electrode in a cross-sectional view of the display device.

9. The display device of claim 1, further comprising:
an overcoat including a first overcoat portion and a second overcoat portion,
wherein the first roof layer is positioned between the first substrate portion and the first overcoat portion,
wherein the second overcoat portion overlaps the third substrate portion, and
wherein a distance between the first substrate portion and the first common electrode portion is less than a distance between the third substrate portion and the second overcoat portion.

10. The display device of claim 9, further comprising:
a second common electrode portion spaced from the first common electrode portion, electrically connected to the first common electrode portion, and positioned between the second substrate portion and the second roof layer; and
an insulating material portion positioned between the first common electrode portion and the second common electrode portion and positioned between the third substrate portion and the second overcoat portion.

* * * * *